(12) United States Patent
Keller et al.

(10) Patent No.: US 12,475,364 B2
(45) Date of Patent: Nov. 18, 2025

(54) DEVICE AND COMPUTER IMPLEMENTED METHOD FOR TRAINING AN ARTIFICIAL NEURAL NETWORK USING CHANNEL GROUPS

(71) Applicant: Robert Bosch GmbH, Stuttgart (DE)

(72) Inventors: Thomas Andy Keller, Amsterdam (NL); Anna Khoreva, Stuttgart (DE); Max Welling, Bussum (NL)

(*) Notice: Subject to any disclaimer, the term of this patent is extended or adjusted under 35 U.S.C. 154(b) by 619 days.

(21) Appl. No.: 16/983,717

(22) Filed: Aug. 3, 2020

(65) Prior Publication Data
US 2021/0081784 A1    Mar. 18, 2021

(30) Foreign Application Priority Data
Sep. 17, 2019  (EP) ..................... 19197807

(51) Int. Cl.
   *G06N 3/08* (2023.01)
   *G06F 17/15* (2006.01)
   *G06N 3/045* (2023.01)

(52) U.S. Cl.
   CPC .............. *G06N 3/08* (2013.01); *G06F 17/15* (2013.01); *G06N 3/045* (2023.01)

(58) Field of Classification Search
   CPC .......... G06N 3/08; G06N 3/045; G06N 3/048; G06N 3/084; G06F 17/15; G06F 18/214;
   (Continued)

(56) References Cited

U.S. PATENT DOCUMENTS

| 6,038,337 A * | 3/2000 | Lawrence ............ G06V 10/454 |
| | | 382/156 |
| 2014/0169623 A1* | 6/2014 | Liu ........................ G06V 40/23 |
| | | 382/103 |

(Continued)

FOREIGN PATENT DOCUMENTS

| CN | 109086886 A | 12/2018 |
| CN | 109472352 A | 3/2019 |

(Continued)

OTHER PUBLICATIONS

Cohen, T. et al., "Group Equivariant Convolutional Networks", http://proceedings.mlr.press/v48/cohenc16.html (Year: 2016).*

(Continued)

*Primary Examiner* — Alexey Shmatov
*Assistant Examiner* — Devika S Maharaj
(74) *Attorney, Agent, or Firm* — NORTON ROSE FULBRIGHT US LLP

(57) ABSTRACT

Device and method for training an artificial neural network, including providing a neural network layer for an equivariant feature mapping having a plurality of output channels, grouping channels of the output channels into a number of distinct groups, wherein the output channels of each individual distinct group are organized into an individual grid defining a spatial location of each of the output channels of the individual distinct group in the grid for the individual distinct group, providing for each of the output channels of each individual distinct group, a distinct normalization function which is defined depending on the spatial location of the output channel in the grid in that this output channel is organized and depending on tunable hyperparameters for the normalization function, determining an output of the artificial neural network depending on a result of each of the (Continued)

distinct normalization functions, training the hyperparameters of the artificial neural network.

10 Claims, 2 Drawing Sheets

(58) Field of Classification Search
CPC ...... G06F 18/24; G06V 10/267; G06V 20/10; G06V 20/56; G06V 20/582; G06V 20/584; G06V 40/103
See application file for complete search history.

(56) References Cited

U.S. PATENT DOCUMENTS

| | | | |
|---|---|---|---|
| 2017/0300783 A1* | 10/2017 | Kumar | G06V 10/7715 |
| 2018/0154899 A1* | 6/2018 | Tiwari | B60W 10/20 |
| 2019/0220653 A1* | 7/2019 | Wang | G06V 40/172 |
| 2019/0251441 A1 | 8/2019 | Lu et al. | |
| 2020/0242353 A1* | 7/2020 | Zhang | G06N 3/045 |
| 2020/0302286 A1* | 9/2020 | Nam | G06N 3/084 |
| 2020/0302299 A1* | 9/2020 | Nagel | G06N 3/04 |
| 2020/0410337 A1* | 12/2020 | Huang | G06N 3/04 |
| 2022/0147791 A1* | 5/2022 | Yao | G06N 3/0495 |

FOREIGN PATENT DOCUMENTS

| | | |
|---|---|---|
| CN | 109902602 A | 6/2019 |
| WO | 2017142397 A1 | 8/2017 |

OTHER PUBLICATIONS

Zhang, Z. et al., "Differentiable Learning-to-Group Channels via Groupable Convolutional Neural Networks", https://arxiv.org/abs/1908.05867 (Year: 2019).*
Kotovenko, et al.: "A Content Transformation Block for Image Style Transfer", 2019 IEEE/CVF Conferencde on Computer Vision and Pattern Recognition (CVPR), IEEE/CVF, (2019), pp. 10024-10033, XP033686858.
Wu, et al.: "Improving Interpretability and Regularization in Deep Learning", IEEE/ACM Transactions on Audio, Speech, and Language Processing, IEEE, USA, 26(2), (2018), pp. 256-265, XP058385010.
Wu and He: "Group Normalization", International Conference on Financial Cryptography and Data Security, ECCV 2018, [Lecture Notes in Computr Science LNCS 11217], Springer, Berlin, DE, pp. 3-19, XP047489288.
Podilchuk and Safranek: "Image and Video Compression: A Review," Int'l J. of High Speed Electronics and Systems, World Sci. Publ., 8(1), (1997), pp. 119-177.

* cited by examiner

DEVICE AND COMPUTER IMPLEMENTED METHOD FOR TRAINING AN ARTIFICIAL NEURAL NETWORK USING CHANNEL GROUPS

CROSS REFERENCE

The present application claims the benefit under 35 U.S.C. § 119 of European Patent Application EP 19197807.1 filed on Sep. 17, 2019, which is expressly incorporated herein by reference in its entirety.

FIELD

The present invention relates to a device and computer implemented method for training an artificial neural network.

BACKGROUND INFORMATION

State of the art neural networks are known to be overparameterized and require vast amounts of data to train. It is therefore desirable to make the training procedure both easier and more sample efficient.

SUMMARY

An example device and method of the present invention may make the training procedure both easier and more sample efficient.

In accordance with an example embodiment of the present invention, a computer implemented method for training an artificial neural network, comprises providing a neural network layer for an equivariant feature mapping having a plurality of output channels, in particular a convolutional neural network layer, grouping channels of the plurality of output channels of the neural network layer into a number of distinct groups, wherein the output channels of each individual distinct group are organized into an individual grid defining a spatial location of each of the output channels of the individual distinct group in the grid for the individual distinct group, providing for each of the output channels of each individual distinct group of the number of distinct groups a distinct normalization function, wherein the distinct normalization function is defined depending on the spatial location of the output channel in the grid in that this output channel is organized and depending on tunable hyperparameters for the normalization function, determining an output of the artificial neural network depending on a result of each of the distinct normalization functions, training the hyperparameters in a training of the artificial neural network. This way, data symmetries are used for improvements in training data collection effort, sample efficiency and generalization accuracy of the training. No explicit knowledge or analytic representation of the transformations defining the data symmetry are required. This is achieved by using a concept of maintaining transformed copies of learned filters. The transformed copies of the filters are learned automatically directly from the data. This is achieved by inducing an arbitrary topology over a convolutional filter, or the convolutional filters in each layer of the artificial neural network basically aligning them in a 1D, 2D, or N-D grid and encouraging filters which are closer to each other in this topology to be more correlated than those which are further apart. This results in smooth transformations of filters, leading to better generalization and improved equivariance. The normalization function is a local normalization function that is applied to the output of each convolutional layer as a means to encourage correlation. This results in a topological feature map organization for the purpose of learning equivariant representations, and improves the generalization. The method enables training of networks, which are approximately equivariant to unknown transformations by learning these directly from the data, as well as approximately equivariant to transformations for which there, may not be an analytic representation such as changes in lighting.

Advantageously, the example method comprises providing a dimension parameter, grouping the channels of the plurality of output channels of the neural network layer into a number of distinct groups each having a size, where the size is defined depending on a total number of output channels of the neural network layer and organizing for each group its output channels into a grid having a dimension according to the dimension parameter. This parametrizes the dimension parameter for the training with variable sizes of the groups.

Advantageously, the example method comprises determining a rescaling parameter per output channel, rescaling the output for the output channel after normalization depending on the rescaling parameter for this output channel. This introduces further trainable parameters.

Advantageously, the example method comprises providing for an output channel a neighborhood function defining a set of output channels, wherein the normalization function for this output channel is defined depending on output channels of the neural network layer in the set of output channels and disregarding other output channels. The neighborhood function provides a parameterized size of a set of nearby output channels.

Advantageously, the set of output channels is defined by a distance parameter defining a distance between output channels of the neural network layer, and training the distance parameter in the training. This is a very efficient parameter for the training.

Advantageously, the set of output channels is defined by a spatial distance parameter defining a distance between output channels of the neural network layer in the grid, and training the spatial distance parameter in the training. Preferably, the neighborhood function operates not simply over channels but also over the spatial extent. This makes a regularization effect stronger and improves generalization performance in highly data-limited scenarios.

Advantageously, the example method comprises providing sensor data, in particular characterizing a digital image, processing the sensor data depending on the so trained artificial neural network to determine an output signal for classifying the sensor data, detecting, localizing or segmenting object in the sensor data, and/or detect anomalies in the sensor data. The topology of the grid is hence learned from the sensor data in the training.

Advantageously, the example method comprises actuating a physical system depending on the output signal or generating input data for a generative adversarial neural network or a variational autoencoder for data synthesis. The normalization function may form a layer that can be integrated as layer normalization into generative adversarial neural networks or variational autoencoders.

Advantageously, the example artificial neural network is adapted for segmenting, classifying or detecting pedestrians, road signs and/or vehicles in digital images, the method comprising collecting a set of digital images from a database; applying one or more transformations to each digital image including mirroring, rotating, smoothing, or contrast reduction to create a modified set of digital images; creating a first training set comprising the collected set of digital images, the modified set of digital images, and a set of digital images unrelated to pedestrians, road signs and/or vehicles; training the artificial neural network in a first stage using the first training set; creating a second training set for a second stage of training comprising the first training set and digital images that are incorrectly detected as images depicting pedestrians, road signs and/or vehicles after the first stage of training; and training the neural network in a second stage using the second training set.

In accordance with an example embodiment of the present invention, a device for processing data comprises an input for data, an output for an output signal, at least one processor and memory for an artificial neural network that are adapted to execute the method.

Further advantageous embodiments are derivable from the description below and the figures.

DETAILED DESCRIPTION OF EXAMPLE EMBODIMENTS

Figure 1:
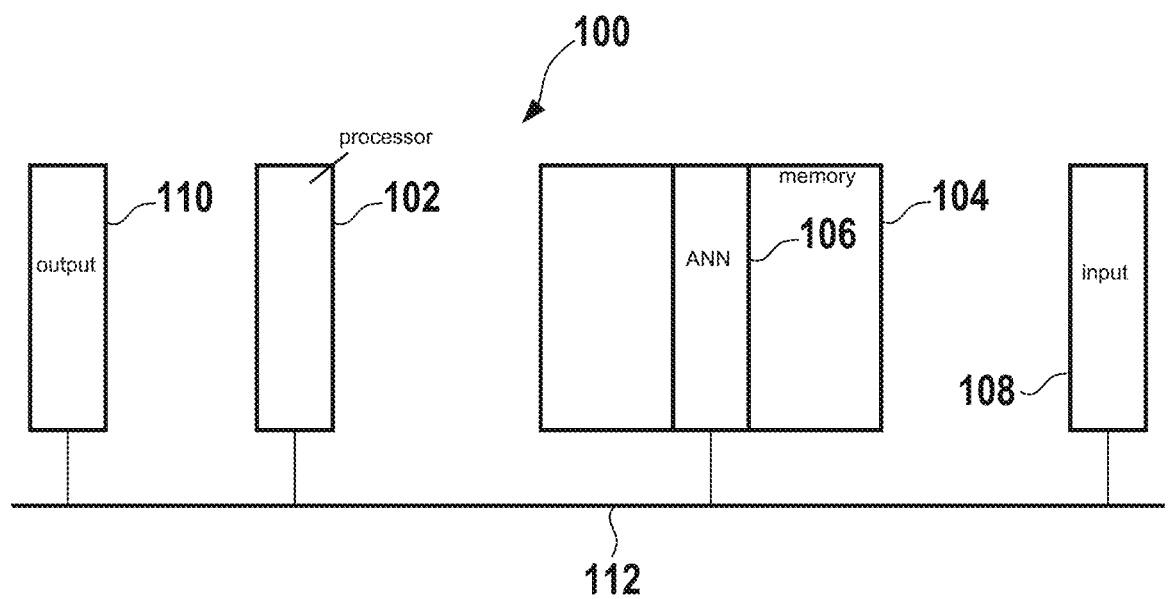
FIG. 1 depicts schematically a device for processing data in accordance with an example embodiment of the present invention.

FIG. 1 depicts aspects of a device 100 for processing data in accordance with an example embodiment of the present invention. Data in the example is sensor data. In particular in the example digital images represented by the data is processed.

The device 100 comprises at least one processor 102 and memory 104 for an artificial neural network 106. The device 100 comprises an input 108 for the data, an output 110 for an output signal. These elements of the device 100 interact via a data connection 112.

In general, video, radar, LiDAR, ultrasonic, thermal imaging or motion sensor data may be processed.

The sensor data is processed depending on an artificial neural network 106 to determine an output signal. The sensor data may be processed for classifying the sensor data, detecting, localizing or segmenting object in the sensor data, and/or detect anomalies in the sensor data. The output signal may be used for actuating a physical system depending on the output signal or generating input data for a generative adversarial network, GAN, or a variational autoencoder, VAE, for data synthesis.

The artificial neural network 106 in the example comprises a convolutional neural network. More generally, the method described below in accordance with an example embodiment of the present invention applies to an artificial neural network 106 having a neural network layer for an equivariant feature mapping $f: X \to Z$ in particular a convolutional neural network layer.

Figure 2:
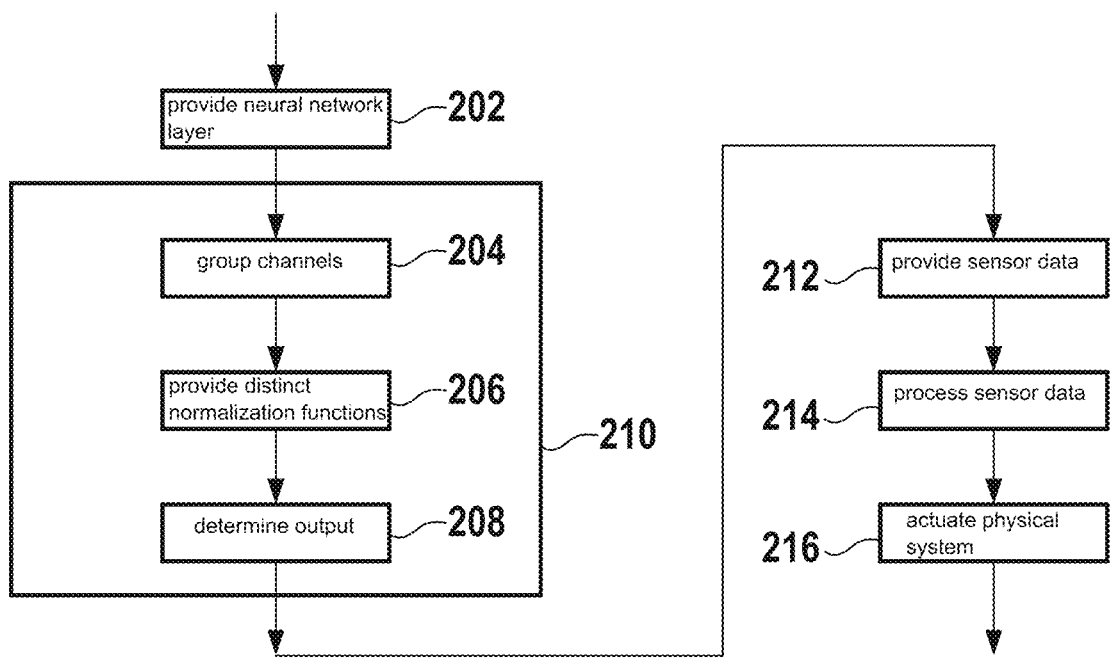
FIG. 2 depicts steps in a method for an artificial neural network in accordance with an example embodiment of the present invention.

The method is described below referencing FIG. 2.

The method comprises in a step 202 providing a neural network layer for equivariant feature mapping $f: X \to Z$ having a plurality of output channels $z_{h,w,g,d}$. In the example, the convolutional neural network layer is provided. Let $f: X \to Z$ for example be a convolutional neural network layer where $X \subseteq \mathbb{R}^{H_{in} \times W_{in} \times C_{in}}$ and $Z \subseteq \mathbb{R}^{H_{out} \times W_{out} \times C_{out}}$ are the input and output spatial height and width respectively, and $C_{in}$, $C_{out}$ are the number of input and output channels respectively. Thus, the neural network layer is composed $C_{out}$ convolutional kernels, each with $n \times n \times C_{in}$ trainable parameters, where n denotes a filter size that is decided by a modeler of the neural network layer.

The step 202 may comprise providing a dimension parameter M and grouping the channels of the plurality of output channels $z_{h,w,g,d}$ of the neural network layer into a number G of distinct groups g each having a size D: $Z_{grouped} \in \mathbb{R}^{H_{out} \times W_{out} \times G \times D}$ The size D is in the example defined depending on a total number $C_{out}$ of output channels $z_{h,w,g,d}$ of the neural network layer for example as $D = C_{out}/G$.

The step 202 may comprise organizing for each group $g \in G$ its output channels $z_{h,w,g,d}$ into a grid having a dimension according to the dimension parameter M.

The method comprises in a step 204 grouping channels of the plurality of output channels $z_{h,w,g,d}$ of the neural network layer into a number G of distinct groups g.

The output channels $z_{h,w,g,d}$ of each individual distinct group g are organized into an individual M-dimensional grid defining a spatial location h,w of each of the output channels $z_{h,w,g,d}$ of the individual distinct group g in the grid for the individual distinct group g.

The method comprises in a step 206 providing for each of the output channels $z_{h,w,g,d}$ of each individual distinct group g of the number G of distinct groups g a distinct normalization function $$LS(z_{h,w,g,d}) = \frac{\alpha \Sigma_{s \in N_k(d)} z_{h,w,g,s}^p}{C + \alpha \Sigma_{s \in N_k(d)} z_{h,w,g,s}^p} \frac{z_{h,w,g,d}^\gamma}{\alpha (\Sigma_{s \in N_k(d)} z_{h,w,g,s}^p)^\beta}$$

Where $\alpha, \beta, C, \gamma, p, k$ are tunable hyperparameters.

The normalization function $LS(z_{h,w,g,d})$ for this output channel $z_{h,w,g,d}$ is defined depending on output channels $z_{h,w,g,d}$ of the neural network layer in the set of output channels $z_{h,w,g,d}$ and disregarding other output channels.

In the example, a neighborhood function $N_k(d)$ is provided that defines a set of output channels $z_{h,w,g,d}$.

The set of output channels $z_{h,w,g,d}$ may be defined in the neighborhood function $N_k(d)$ by a distance parameter k defining a distance between output channels $z_{h,w,g,d}$ of the neural network layer. In an example, each output channel is identified by an index and the distance is defined as a numeric distance between the indices of two output channels.

In an example for each output channel $d \in D$ a size of the neighborhood for an output channel $d = 10$ for a grid with the dimensional parameter $M = 1$, i.e. a 1-dimensional grid, for $k = 2$, the neighborhood function is $N_k(d) = \{8, 9, 10, 11, 12\}$.

In another example, a spatial neighborhood function $N_{l,m}(h,w)$ may be defined. The set of output channels $z_{h,w,g,d}$ may be defined by a spatial distance parameter l,m defining a distance between output channels $z_{h,w,g,d}$ of the neural network layer in the grid.

Any boundary conditions for the neighborhood function are a modeling choice and can be chosen to either be circular, zero-padded, or other common padding techniques.

In an example, the following parameters may be used:

$$\alpha = \frac{1}{2k+1}, \beta = 2, C = 1, \gamma = 1, p = 2$$

An optimal value of k depends on the size of D, and the neural network layer to which it is applied. In an example, k≈0.2*D is used.

In general, the distinct normalization function $LS(z_{h,w,g,d})$ depends on the spatial location h,w of the output channel $z_{h,w,g,d}$ in the grid in that this output channel $z_{h,w,g,d}$ is organized.

The distinct normalization function $LS(z_{h,w,g,d})$ is in the example defined depending on the spatial location h,w and depending on tunable hyperparameters for the normalization function $LS(z_{h,w,g,d})$.

The method comprises a step 208 of determining an output of the artificial neural network 106 depending on a result of each of the distinct normalization functions $LS(z_{h,w,g,d})$.

The method comprises a step 210 of training the parameters and the hyperparameters in a training of the artificial neural network 106. In particular the distance parameter k and the spatial distance parameter l,m are trained. The artificial neural network 106 is trained depending on the output.

In the example, the step 202 is executed before the training to fix the grid. In the step 210, the steps 204 to 208 are repeatedly executed for processing training data. The parameters of the artificial neural network 106 are determined and updated in the training, e.g., by a gradient descent method minimizing a loss criteria.

After the end of the training, a step 212 is executed.

The step 212 comprises providing sensor data, in particular characterizing a digital image.

Afterwards a step 214 is executed.

In the step 214, the sensor data is processed depending on the so trained artificial neural network 106 to determine an output signal. The output signal is processed in the example for classifying the sensor data, detecting, localizing or segmenting object in the sensor data, and/or detect anomalies in the sensor data.

Afterwards a step 216 is executed.

In the step 216, a physical system is actuated depending on the output signal.

Instead or additionally to this, the sensor data may be processed for generating input data for a generative adversarial neural network or a variational autoencoder for data synthesis.

The method may further comprises determining a rescaling parameter $\eta_{g,d}$ per output channel $z_{h,w,g,d}$, and rescaling the output for the output channel $z_{h,w,g,d}$ after normalization depending on the rescaling parameter $\eta_{g,d}$ for this output channel $z_{h,w,g,d}$. The output of the artificial neural network 106 is determined in this case depending on a rescaled output $\hat{y}_{h,w,g,d}$ for the output channel $z_{h,w,g,d}$ e.g. $\hat{y}_{h,w,g,d} = \eta_{g,d} LS(z_{h,w,g,d})$.

Normalization function as described above is a local-squash function that is used as a standard layer of a convolutional neural network and is placed after convolution. If the convolutional neural network comprises any of or combinations of batch normalization, pooling, activation function and dropout layers, the local-squash function is placed after convolution, optional batch normalization, and optional pooling, and before optional activation function and an optional dropout layers.

The local-squash function can be implemented as a layer in the artificial neural network 106. This layer can be placed anywhere between two convolution operations, and can be applied on every layer, or only on desired layers. Preferably, this layer is placed between batchnorm and activation function layers. Preferably, this a local-squash function is applying it to more than a single layer of the artificial neural network 106.

This way, a topology, i.e., the grid, is induced over the output channels of the CNN layer described above. The artificial neural network 106 is encouraged to learn intermediate transformations between existing filters. The local-squash function layer is an 'intermediate' filter that increases the number of transformations, which the artificial neural network 106 captures in its representation, and thus is equivariant to.

The desired induced topology is achieved by the aforementioned normalization function. The artificial neural network 106 may comprise a plurality of CNN layers and intermediate filters, i.e., local-squash function layers.

Figure 3C:
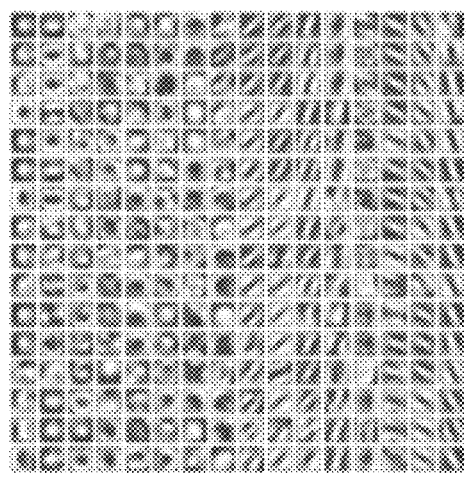
FIG. 3a, 3b, 3c shows examples of filters for processing data in accordance with an example embodiment of the present invention.
Figure 3B:
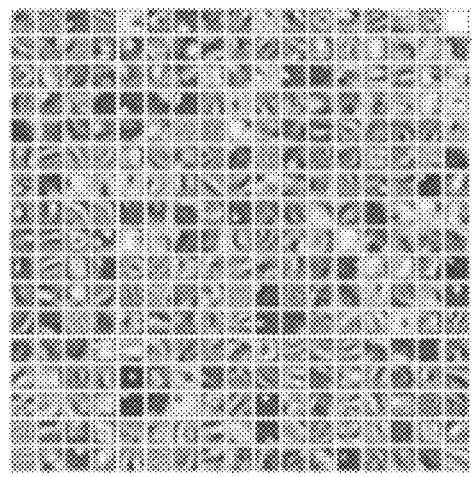
Figure 3A:
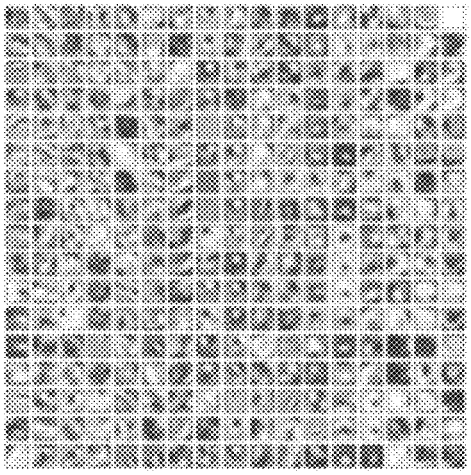

FIG. 3a depicts 17×17 pixel of an output of filters comprising the local-squash function for a 1-dimensional grid. The filters that result in the output of FIG. 3a are organized in the original potentially unknown grid formulation. The FIG. 3b depicts 17×17 pixel of an output of filters without the local-squash function. The FIG. 3c depicts 17×17 pixel of an output of filters with a clear 1-dimensional grid and smooth transitions learned using the local-squash function. The trained weights of the artificial neural network 106 in this case represent a topological structure organized in the in the learned grid of the intermediate filters at each layer.

The artificial neural network 106 may be used in image data processing in a vehicle or robot or for medical devices or machines processing image data for determining actions to be executed by actuators thereof.

In particular, the artificial neural network 106 may be adapted for segmenting, classifying or detecting pedestrians, road signs and/or vehicles in digital images.

The method may comprise collecting a set of digital images from a database. The method may comprise applying one or more transformations to each digital image including mirroring, rotating, smoothing, or contrast reduction to create a modified set of digital images. The method may comprise creating a first training set comprising the collected set of digital images, the modified set of digital images, and a set of digital images unrelated to pedestrians, road signs and/or vehicles. The method may comprise training the artificial neural network 106 in a first stage using the first training set. The method may comprise creating a second training set for a second stage of training comprising the first training set and digital images that are incorrectly detected as images depicting pedestrians, road signs and/or vehicles after the first stage of training. The method may comprise training the artificial neural network 106 in a second stage using the second training set.

What is claimed is:

1. A computer implemented method for training an artificial neural network, the artificial neural network including a convolutional neural network layer configured to determine an equivariant feature mapping having a plurality of output channels, the method comprising the following steps:
operating the convolutional neural network layer to produce the plurality of output channels;
operating an intermediate filter layer of the artificial neural network after the convolutional neural network layer, the intermediate filter layer receiving the plurality of output channels and performing steps of:
grouping channels of the plurality of output channels into a plurality of distinct groups, wherein the output channels of each individual distinct group of the plurality of distinct groups are organized into an individual grid defining a spatial location of each of the output channels of the individual distinct group in the grid, wherein each output channel of each individual distinct group is associated with an index;

executing, for each output channel of the plurality of output channels, a neighborhood function defining a set of output channels according to a distance parameter defining a spatial distance between output channels of the neural network layer, the spatial distance being a function of indices of the output channels;

executing, for each of the output channels of each individual distinct group of the plurality of distinct groups, a distinct normalization function, wherein the distinct normalization function is defined depending on the spatial location of the output channel in the grid that the output channel is organized, depending on tunable hyperparameters for the normalization function, and depending on output channels in the set of output channels defined by the neighborhood function and disregarding other output channels; and determining an output of the artificial neural network depending on a result of each of the distinct normalization functions; and training the distance parameter and the hyperparameters by repeating the steps performed by the intermediate filter layer a plurality of times.

2. The method according to claim 1, further comprising:
providing a dimension parameter, wherein the grouping step includes grouping the channels of the plurality of output channels of the neural network layer into a number of distinct groups each having a size, where the size is defined depending on a total number of output channels of the neural network layer, and organizing for each of the distinct groups its output channels into a grid having a dimension according to the dimension parameter; and
training the dimension parameter.

3. The method according to claim 1, further comprising:
determining a rescaling parameter for each of the output channels; and
rescaling the output for each of the output channels after normalization depending on the rescaling parameter for the output channel.

4. The method according to claim 1, further comprising:
providing sensor data characterizing a digital image;
processing the sensor data depending on the trained artificial neural network to determine an output signal for classifying the sensor data; and
(i) detecting or localizing or segmenting, object in the sensor data, and/or (ii) detecting anomalies in the sensor data.

5. The method according to claim 4, further comprising:
(i) actuating a physical system depending on the output signal, or (ii) generating input data for a generative adversarial neural network or a variational autoencoder for data synthesis.

6. The method according to claim 1, wherein the artificial neural network is adapted for segmenting or classifying or detecting: pedestrians and/or road signs and/or vehicles, in digital images, the method further comprising:
collecting a set of digital images from a database;
applying one or more transformations to each digital image including mirroring, or rotating, or smoothing, or contrast reduction, to create a modified set of digital images;
creating a first training set including the collected set of digital images, the modified set of digital images, and a set of digital images unrelated to pedestrians and/or road signs and/or vehicles;
training the artificial neural network in a first stage using the first training set;
creating a second training set for a second stage of training including the first training set and digital images that are incorrectly detected as images depicting pedestrians and/or road signs and/or vehicles, after the first stage of training; and
training the artificial neural network in a second stage using the second training set.

7. A device for processing data, comprising:
an input for data;
an output for an output signal;
at least one processor; and
memory for an artificial neural network;
wherein the device is configured to train the artificial neural network, the artificial neural network including a convolutional neural network layer configured to determine an equivariant feature mapping having a plurality of output channels, and the device is configured to:
operate the convolutional neural network layer to produce the plurality of output channels;
operate an intermediate filter layer of the artificial neural network after the convolutional neural network layer, the intermediate filter layer receiving the plurality of output channels and performing steps of:
group channels of the plurality of output channels into a plurality of distinct groups, wherein the output channels of each individual distinct group of the plurality of distinct groups are organized into an individual grid defining a spatial location of each of the output channels of the individual distinct group in the grid, wherein each output channel of each individual distinct group is associated with an index;
execute, for each output channel of the plurality of output channels, a neighborhood function defining a set of output channels according to a distance parameter defining a spatial distance between output channels of the neural network layer, the spatial distance being a function of indices of the output channels;
execute, for each of the output channels of each individual distinct group of the plurality of distinct groups, a distinct normalization function, wherein the distinct normalization function is defined depending on the spatial location of the output channel in the grid that the output channel is organized, depending on tunable hyperparameters for the normalization function, and depending on output channels in the set of output channels defined by the neighborhood function and disregarding other output channels; and
determine an output of the artificial neural network depending on a result of each of the distinct normalization functions; and
train the distance parameter and the hyperparameters by repeating the steps performed by the intermediate filter layer a plurality of times.

8. A non-transitory computer-readable storage medium on which is stored a computer program including machine-readable instructions for training an artificial neural network, the artificial neural network including a convolutional neural network layer configured to determine an equivariant feature mapping having a plurality of output channels, the instructions, when executed by a computer, causing the computer to perform the following steps:
  operating the convolutional neural network layer to produce the plurality of output channels;
  operating an intermediate filter layer of the artificial neural network after the convolutional neural network layer, the intermediate filter layer receiving the plurality of output channels and performing steps of:
    grouping channels of the plurality of output channels into a plurality of distinct groups, wherein the output channels of each individual distinct group of the plurality of distinct groups are organized into an individual grid defining a spatial location of each of the output channels of the individual distinct group in the grid, wherein each output channel of each individual distinct group is associated with an index;
    executing, for each output channel of the plurality of output channels, a neighborhood function defining a set of output channels according to a distance parameter defining a spatial distance between output channels of the neural network layer, the spatial distance being a function of indices of the output channels;
    executing, for each of the output channels of each individual distinct group of the plurality of distinct groups, a distinct normalization function, wherein the distinct normalization function is defined depending on the spatial location of the output channel in the grid that the output channel is organized, depending on tunable hyperparameters for the normalization function, and depending on output channels in the set of output channels defined by the neighborhood function and disregarding other output channels; and
    determining an output of the artificial neural network depending on a result of each of the distinct normalization functions; and
  training the distance parameter and the hyperparameters by repeating the steps performed by the intermediate filter layer a plurality of times.

9. The computer implemented method of claim 1, further comprising:
  processing sensor data using the trained artificial neural network in at least one of a vehicle, a robot, or a medical device; wherein the processing produces an output signal at least one of: detecting objects in the sensor data, segmenting objects in the sensor data, or classifying objects in the sensor data; and
  actuating an actuator to control the at least one of the vehicle, robot, or medical device based on the detected, segmented or classified objects.

10. The computer implemented method of claim 1, further comprising:
  processing sensor data in a vehicle using the trained artificial neural network to produce an output signal detecting, segmenting or classifying at least one object including at least one of:
a pedestrian, road sign, or other vehicle; and
  actuating an actuator to control the vehicle based on the detected, segmented or classified objects.

* * * * *